United States Patent [19]

Sjöbom

[11] 4,333,693
[45] Jun. 8, 1982

[54] AXLE BEARING

[76] Inventor: Axel H. Sjöbom, Postlada 7919, S-860 20 Njurunda, Sweden

[21] Appl. No.: 899,796

[22] Filed: Apr. 25, 1978

Related U.S. Application Data

[63] Continuation of Ser. No. 733,954, Oct. 19, 1976, abandoned.

[30] Foreign Application Priority Data

Nov. 6, 1975 [SE] Sweden .............................. 7512455

[51] Int. Cl.³ .............................................. F16C 19/00
[52] U.S. Cl. ..................... 308/176; 308/6 R; 308/15; 308/59; 308/64; 308/65
[58] Field of Search .................. 308/31, 6 R, 6 B, 63, 308/64, 69, 176, 183, 203, 237 R, 58, 59, 65, 207 A, 15, 92, 93, 97; 64/23.7; 266/246

[56] References Cited

U.S. PATENT DOCUMENTS

| 2,639,199 | 5/1953 | Patrosio | 308/59 |
| 2,642,321 | 6/1953 | Van Dyke | 308/65 |
| 2,964,250 | 12/1960 | Asplund | 308/176 |
| 3,523,714 | 8/1970 | Puhringer | 308/15 |
| 3,963,281 | 6/1976 | Riegler et al. | 308/176 |

FOREIGN PATENT DOCUMENTS

| 349779 | 2/1936 | Fed. Rep. of Germany | 114/137 |
| 837086 | 3/1952 | Fed. Rep. of Germany | 308/64 |
| 1430517 | 12/1966 | France | 114/136 |

Primary Examiner—Charles E. Frankfort

[57] ABSTRACT

An adjustable axle bearing is disclosed which comprises an inner bearing housing for receiving a radial bearing therein and a stationary outer bearing housing in which the inner bearing is movable in an axial direction. The inner bearing housing is supported by at least one support member stationary relative to the outer housing in one half of the outer housing and at least one radially movable support member in the opposed half of the outer housing.

10 Claims, 3 Drawing Figures

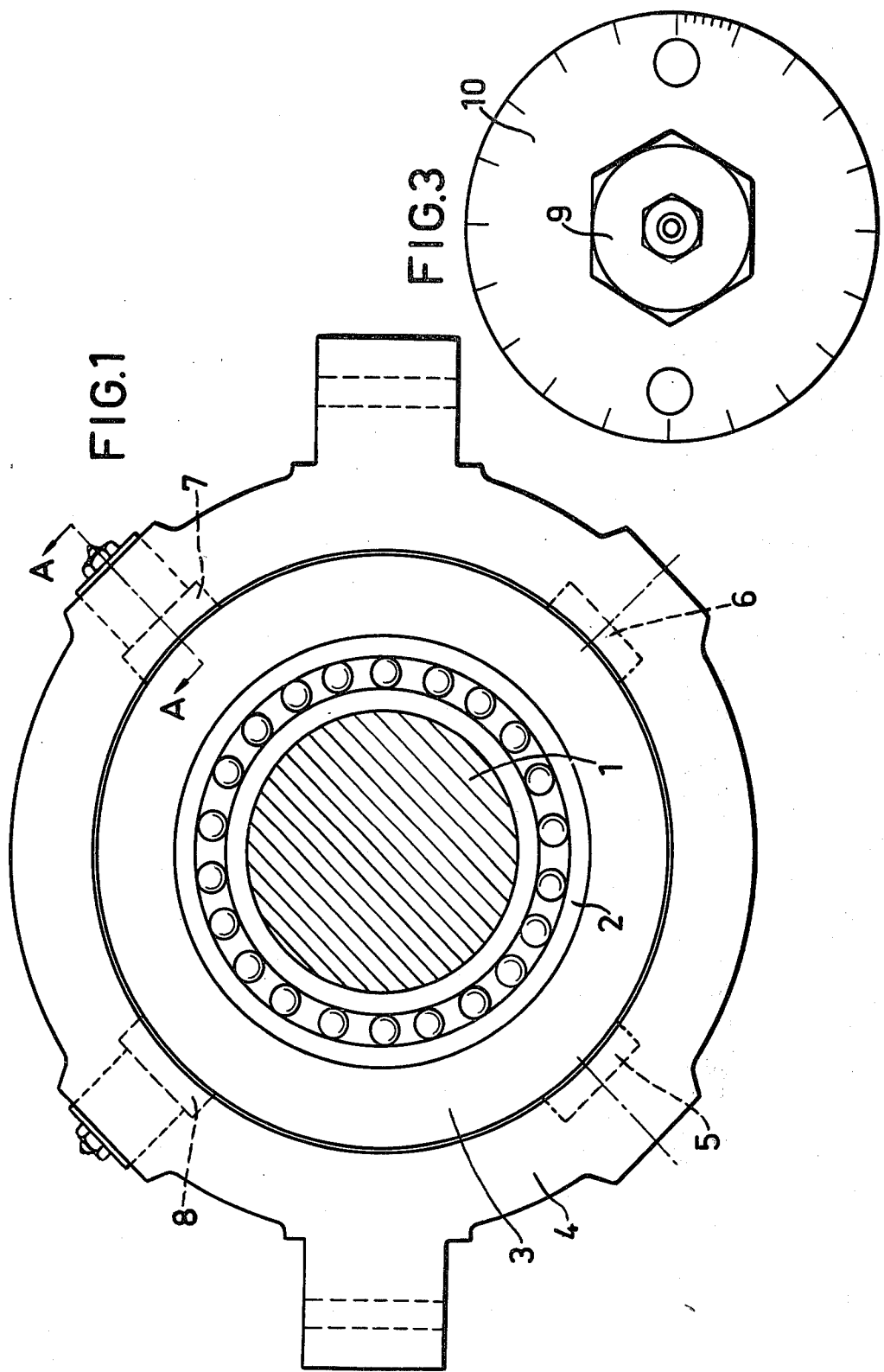

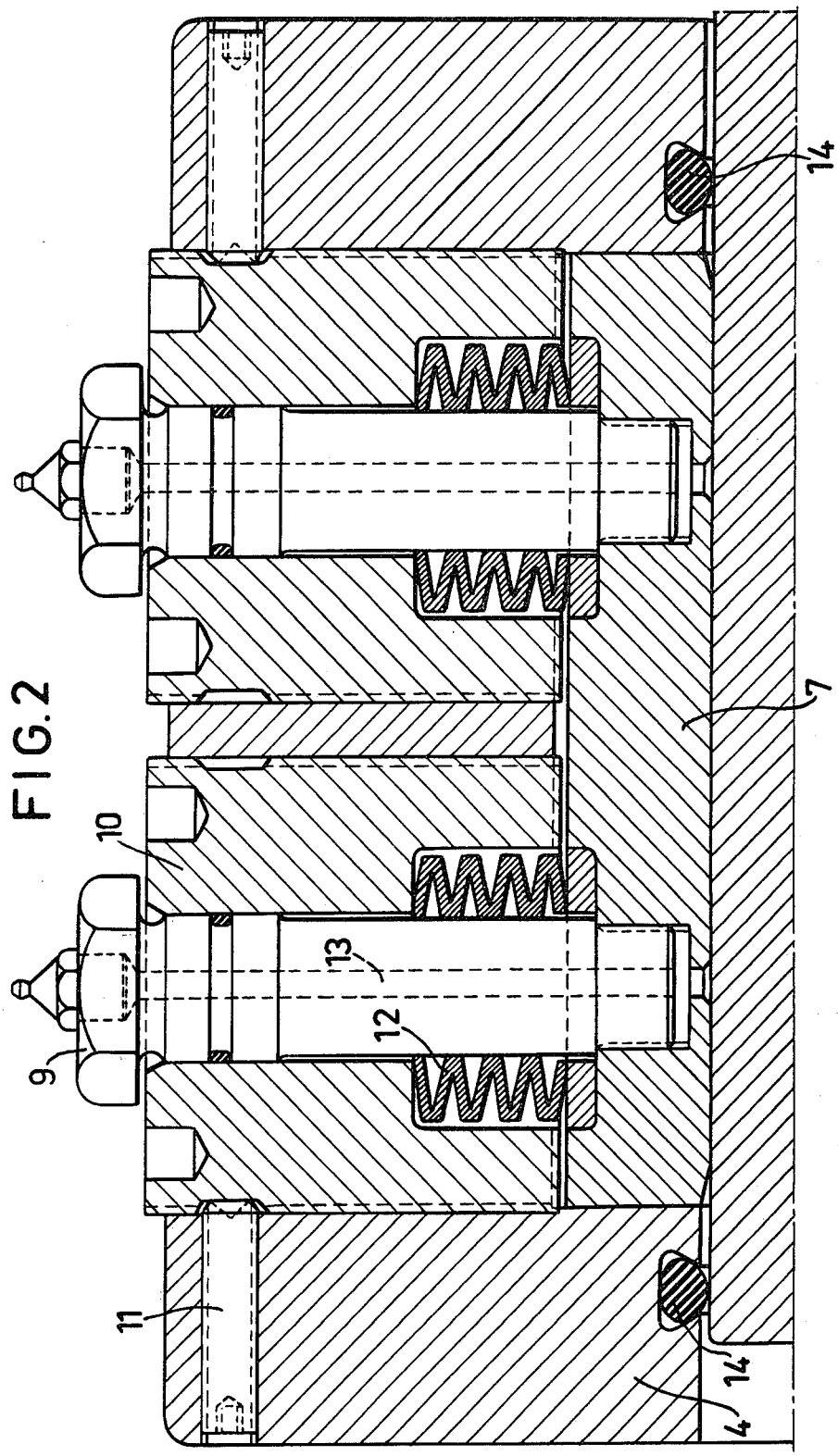

AXLE BEARING

This is a continuation of application Ser. No. 733,954, filed Oct. 19, 1976, now abandoned.

BACKGROUND OF THE INVENTION

This invention relates to axle bearings and, more particularly, to a device for adjusting the bearing housing clearance in an axle bearing.

A typical axle bearing for a displaceable axle comprises an inner bearing housing for receiving an axle-carrying radial bearing and a stationary outer bearing housing. The inner bearing housing is located in the outer bearing housing and axially displaceable relative thereto. The purpose of this arrangement is to permit axial displacement of the axle carried by the radial bearing.

In many applications a very small radial clearance is required between the inner and outer bearings in order to avoid vibrations or other disturbances. The desired clearance ideally is ±0, and even a clearance approaching 0.1 mm can give rise to unfavorable and unwanted vibrations. At large bearing diameters, for example about 500 mm, it is very difficult with conventional methods to obtain a clearance below 0.1 mm.

SUMMARY OF THE INVENTION

The foregoing and additional objectives are attained in accordance with the principles of this invention by providing an axle bearing which comprises an inner bearing housing for receiving a radial bearing therein and a stationary outer bearing housing in which the inner bearing housing is axially movable. The inner bearing housing is supported by at least one support member stationary relative to the outer housing in one half of the outer housing and at least one radially movable support member in the opposed half of the outer housing.

BRIEF DESCRIPTION OF THE DRAWING

The foregoing will be more readily apparent upon reading the following description in conjunction with the drawing, in which:

FIG. 1 shows an axle bearing constructed in accordance with the principles of this invention seen in an axial direction;

FIG. 2 is a sectional view taken along the line A—A in FIG. 1; and

FIG. 3 shows a graduated scale for adjusting the bearing housing clearance.

DETAILED DESCRIPTION

Referring now to the drawing, wherein like reference numerals denote like parts, the bearing for the axle 1 comprises a radial bearing 2 attached to the axle and located in an inner bearing housing 3, which in turn is held in an outer bearing housing 4. The inner bearing housing 3 is supported in the outer bearing housing 4 by means of two pairs of diametrically opposed support members, 5, 6, 7, 8, provided in the outer bearing housing. Two support members, 5, 6, are stationary and located in the lower portion of the outer bearing housing, angularly offset from a vertical plane through the axle 1 between 15° and 75°, suitably between 30° and 60° and preferably about 45°. The diametrically opposed support members 7, 8 are movable and adjustable in a radial direction. The movable support members 7, 8 may be bars, shoulders or discs. In a suitable embodiment of the invention only one fixed bar is provided in the lower portion of the outer bearing housing, and a movable circular disc is provided diametrically opposed in the upper portion of the outer bearing housing. The bar and disc can be arranged so that the diameter line connecting the bar and disc is vertical, but it should be inclined between 15° and 75°, suitably between 30° and 60° and preferably about 45° to a vertical plane through the axle. This inclination has proved advantageous in counteracting an oval-shaped wear pattern of the housing.

The fixed support members 5, 6 can advantageously be formed directly in the bearing housing 4 rather than constituting details fitted into the housing. Under certain conditions it is possible to design the fixed support member as a fixed shoulder, alternatively two or more shoulders in a row.

The movable support members 7, 8 are provided with two guide bolts 9 extending radially outward, each of which is enclosed and guided by an adjusting member 10, preferably an adjusting bolt. This member is provided in a threaded-through bore in the wall of the outer bearing housing 4 whereby the member 10 is adjustable in a radial direction. The adjusting members 10 define the radial movement of the movable support members 7, 8 and thereby determine the size of the clearance between opposed support members 5, 7 and 6, 8, respectively, i.e. the clearance between the inner and outer bearing housings 3 and 4 respectively.

For adjusting the bearing housing clearance, first the upper support members 7, 8 are tightened by turning the adjusting members 10 against the inner bearing housing so that a clearance of 0 is obtained. Thereafter the adjusting members 10 are turned in the opposite direction until the desired bearing housing clearance is obtained. By means of a locking screw 11 unintentional turning of the adjusting members 10 is prevented. In order to facilitate the adjustment, a graduated scale is provided on the upper surface of the adjusting members 10, as shown in FIG. 3. The scale is designed so that radial movement of the members 10 corresponds to angular movement which can be read directly.

In order to eliminate the influence of rotating loads and other disturbances in the bearing, a spring package 12, preferably comprising a plurality of cup springs, is located in a recess in each adjusting member 10. The spring packages 12 act between the adjusting members 10 and the movable support members 7, 8 in such a manner, that they press the support members 7, 8 against the inner bearing housing 3.

Lubrication of the contact surfaces between the support members 7, 8 and the inner bearing housing 3 is obtained through passages 13 in the guide bolts 9. Seal members 14, illustratively O-rings, are provided between the inner and outer bearings housing 3 and 4 on both sides of the support members.

The axle bearing according to the present invention may advantageously be utilized in disc refiners for refining cellulose material where the working of the material can give rise to vibrations jeopardizing a good refining result. The principles of this invention, however, are also applicable in other fields, for example in connection with turbines.

Accordingly, there has been described an improved axle bearing. This axle bearing is readily adjustable to provide a desired clearance between the inner and outer bearing housings. Thus, as the bearing housing gets worn, the bearing housing clearance can still be maintained at the desired tolerance. Additionally, if the wear gets too excessive, the parts subject to wear are readily replaced. It is understood that the above-described arrangement is merely illustrative of the application of the principles of this invention. Numerous other arrangements may be devised by those skilled in the art without departing from the spirit and scope of this invention as defined in the appended claims.

What is claimed is:

1. An axle bearing including a stationary outer bearing housing and an inner bearing housing adapted to receive a radial bearing, said inner bearing housing being axially movable within said outer bearing housing, wherein the improvement comprises:
   a first support member fixably secured to said outer bearing housing in one half of said outer housing for supporting said inner bearing housing;
   a second support member in the opposed half of the outer bearing housing, said second support member being radially movable with respect to said outer housing, and said second support member including a contact surface for contacting a complementary contact surface of said inner bearing housing;
   an adjusting member adjustably connected to said outer bearing housing for supporting said second support member for relative radial movement with respect to said adjusting member, said adjusting member providing a limit for limiting the radial movement of said second support member away from said inner bearing housing;
   means for biasing said second support member towards said inner bearing housing; and
   lubricating means for lubricating said contact surfaces of said inner bearing housing and said second support member to permit free sliding movement between said support member and said inner bearing housing.

2. The axle bearing according to claim 1 wherein said means for lubricating said contact surfaces comprises a lubrication passage extending through said adjusting member and through said second support member for introducing lubrication between said contact surfaces of said second support member and said inner bearing housing.

3. The axle bearing according to claim 1 wherein said means for biasing comprises a spring member positioned between said adjusting member and said second support member for urging said second support member against said inner bearing housing.

4. The axle bearing according to claim 1 wherein said outer bearing housing has an internally threaded bore extending therethrough and said adjusting member is externally threaded and positioned in said bore so that adjustment of the limit for limiting the radial movement of said second support member is effected by turning said adjustment member.

5. The axle bearing according to claim 1 wherein said first support member is angularly positioned with respect to a vertical plane through the axle at an angle between 30 degrees and 60 degrees from said vertical plane in the lower half of the outer bearing housing and said second support member is positioned diametrically opposed to said first support member in the upper half of said outer bearing housing.

6. The axle bearing according to claim 1 wherein said first support member comprises a shoulder integrally formed as part of said outer bearing housing.

7. The axle bearing according to claim 1 wherein said first support member comprises a pair of shoulders integrally formed as part of said outer bearing housing and positioned at equal angular displacements with respect to a vertical plane through the center of said bearing and said second support member includes a pair of movable discs each diametrically opposed to a respective one of said pair of shoulders.

8. An axle bearing for an axle of a disc refiner for refining cellulose material, said axle bearing comprising:
   an inner bearing housing;
   a radial bearing supported within said inner bearing housing and adapted to support said axle for rotational movement with respect to said inner bearing housing; and
   a stationary outer bearing housing for supporting said inner bearing housing for axial movement within said outer bearing housing, said outer bearing housing comprising:
      a first support member for supporting said inner bearing housing, said first support member being fixably secured to said outer bearing housing in one half of said outer bearing housing;
      a second support member for supporting said inner bearing housing, said second support member being in the opposed half of said outer bearing housing and being radially movable with respect to said outer bearing housing;
      an adjusting member adjustably connected to said outer bearing housing for supporting said second support member for relative radially movement with respect to said adjusting member, said adjusting member providing a limit for limiting the radial movement of said second support member away from said inner bearing housing; and
      means for biasing said second support member towards said inner bearing housing.

9. The axle bearing of claim 8 wherein said second support member includes a contact surface for contacting a complimentary contact surface of said inner bearing housing, and further including means for lubricating said contact surfaces to permit free sliding movement between said support member and said inner bearing housing.

10. The axle bearing of claim 8 wherein said means for lubricating said contact surfaces comprises a lubrication passage extending through said adjusting member and through said second support member for introducing lubrication between said contact surfaces of said second support member and said inner bearing housing.

* * * * *

UNITED STATES PATENT AND TRADEMARK OFFICE
CERTIFICATE OF CORRECTION

PATENT NO. : 4,333,693
DATED : June 8, 1982
INVENTOR(S) : Axel H. Sjobom

It is certified that error appears in the above-identified patent and that said Letters Patent are hereby corrected as shown below:

On the title page the assignee should read --SCA Development Aktiebolag, Sundsvall, Sweden--.

Column 4, line 54, "8" should read --9--.

Signed and Sealed this

Eighth Day of February 1983

[SEAL]

Attest:

Attesting Officer

GERALD J. MOSSINGHOFF
Commissioner of Patents and Trademarks